W. Mallard.
Mop.

No. 92,624.  Patented July 13, 1869.

Witnesses
John H. Shumway
A. J. Tibbits

W. Mallard
Inventor
By his Attorney
Jno. E. Earle

United States Patent Office.

W. MALLERD, OF BRIDGEPORT, CONNECTICUT, ASSIGNOR TO HIMSELF AND JOHN BARR, OF SAME PLACE.

Letters Patent No. 92,624, dated July 13, 1869.

---

IMPROVEMENT IN MOPS.

---

The Schedule referred to in these Letters Patent and making part of the same.

---

*To all whom it may concern:*

Be it known that I, W. MALLERD, of Bridgeport, in the county of Fairfield, and State of Connecticut, have invented a new Improvement in Mops; and I do hereby declare the following, when taken in connection with the accompanying drawings, and the letters of reference marked thereon, to be a full, clear, and exact description of the same, and which said drawings constitute part of this specification, and represent, in—

Figure 1:
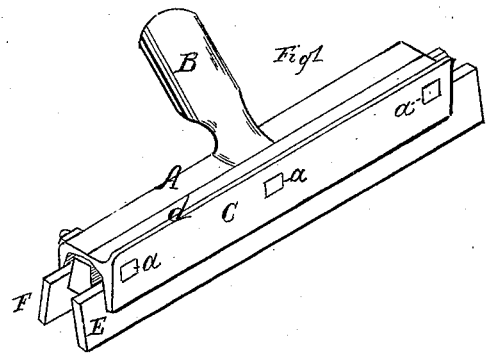

Figure 1, a perspective view, and in

Figure 2:
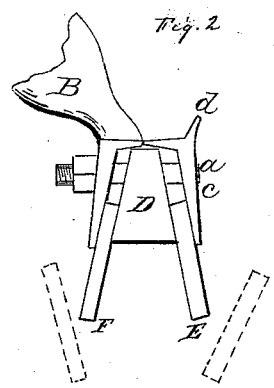

Figure 2, a transverse section.

This invention relates to an improvement in mops, or instruments for scrubbing floors, and consists in combining in such an instrument a scraper, which may be used for removing substances from the floor which resist the scrubber.

In order to the clear understanding of my invention, I will fully describe the same, as illustrated in the accompanying drawings.

A is one part, or jaw, to which a socket, B, for attachment of the handle, is fixed; C, the other part, to which the scraper $d$ is attached or formed upon, the inner surface of the two parts being inclined, the one to the other, as seen in fig. 2; and between the two parts A and C, is a third part, D, and bolts $a$, passing through the three parts, as seen in fig. 2, are the means of clamping the parts together.

F is a piece of soft India rubber, or similar material, placed forward.

E is also a piece of rubber, but of harder formation, made by mixing with the rubber, during its formation, emery or other mineral substance.

Each of these parts is placed in its respective position, as seen in fig. 2, and the whole clamped together by means of bolts $a$.

The instrument is used in the following manner:

For scrubbing, the handle is raised so as to work only with the forward part E, as denoted in red, fig. 2. Then, for drying, the handle is lowered, and the part F is brought to bear only, as denoted in blue, fig. 2, which, being rubbed upon the floor, forces the water before it, clearing the floor from all surplus water.

If any substances are upon the floor which are not easily removed by the scrubber, invert the instrument and apply the scraper.

Having fully described my invention,

What I claim as new and useful, and desire to secure by Letters Patent, is—

In combination with the scrubber E. and drier F, with the holder A and C, formed in two parts, the scraper $d$, as shown and described.

W. MALLERD.

Witnesses:
A. J. TIBBITS,
J. H. SHUMWAY.